Jan. 10, 1928.

T. L. FAWICK

MARINE GEAR

Filed Feb. 7, 1927

Witness
William P. Kilroy

Inventor:
Thomas L. Fawick
By Brown Boettcher Drinner
Attys

Jan. 10, 1928.

T. L. FAWICK 1,655,679

MARINE GEAR

Filed Feb. 7, 1927

Witness:
William P. Kilroy

Inventor:
Thomas L. Fawick

Patented Jan. 10, 1928.

1,655,679

UNITED STATES PATENT OFFICE.

THOMAS L. FAWICK, OF RACINE, WISCONSIN.

MARINE GEAR.

Application filed February 7, 1927. Serial No. 166,343.

My invention relates to transmissions.

The specific object of the present invention is to provide a compact, efficient, and inexpensive reversing gear, such as is desirable for reversal of drive of the propeller shaft of a motor driven boat. While the invention is particularly useful in connection with marine gears, it is not to be limited to such use nor to the specific construction herein shown.

According to my present invention I provide an epicyclic type of gear comprising an inner driving pinion with planet gears or idlers carried in a cage about the driving pinion and a ring gear supported on the outside of the idler or planet pinion. Provision is made for clutching the cage bearing the planet gears or idlers to either a stationary frame member for reverse drive, or to a driven shaft for direct drive.

With this construction the direction of drive may be quickly or gradually thrown one way or the other without imposing any undue stresses upon the mechanism or the parts connected thereto. I provide friction clutching means for effecting the change in connection and arrange the same in efficient, compact manner, and provide operating means for the clutching and de-clutching operations, which gives the operator complete control of the drive.

Now in order to acquaint those skilled in the art with the manner of constructing and operating a device embodying my invention, I shall describe in connection with the accompanying drawings a specific embodiment of the same.

In the drawings:—

Figure 1:
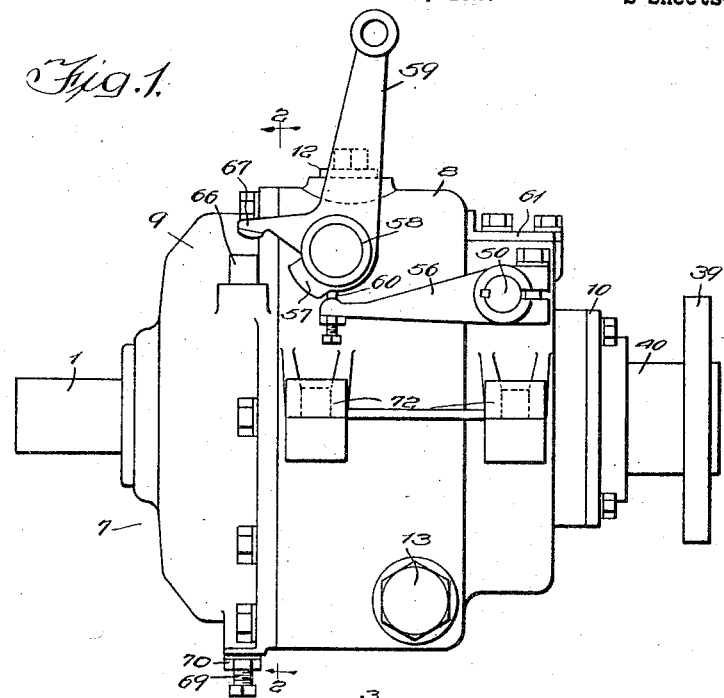
Figure 1 is a side elevational view of the transmission of my invention.

The drive shaft 1, which may be coupled directly to the engine shaft, is provided with an integral pinion 2 which is axially bored to receive the forward reduced end 3 of the driven shaft 4 for the purpose of piloting these two shafts together and to the cage 5.

A suitable thrust and radial bearing 6 has its inner race supported on the shaft 1 and its outer race supported in a suitable recess in the cage or gear box 7, which forms both a lubricant containing housing and a frame for the gearing. This housing is made in two major parts, namely, the body part 8 and the front cover 9. A rear cover plate 10, bearing a packing 11, closes the rear end of the main housing section 8. A filling plug 12 for introducing lubricant and a draining plug 13 for draining the housing are provided.

The forward part of the housing provides a felt packing 14 to prevent the escape of lubricant about the shaft 1, and this packing 14 is held in place by a plate 15 which lies between the outer race of the bearing 6 and the side wall of the recess in which said outer race is housed.

The cage 5 has a series of idlers or planet gears 16, preferably three in number arranged equi-distantly about the pinion 2 and meshing therewith, these pinions being provided with suitable anti-friction liners or bearings 17 mounted on pins 18.

The cage 5 comprises two parts, namely, the forward or main body part 20 and the rear or cover part 21. The front part 20 comprises a cylindrical flange which is recessed to receive the pinions 18. A radially extending flange 22, extending out from the forward end of the body portion, bears a friction drum 23 with which a contracting friction band 24 cooperates.

The rear part or cover part 21 of the cage 5 comprises a plate clamped to the cylindrical flange part of the forward half 20 by means of the machine screws 25 and pilot rings or bushings 26, which bushings take the gearing stresses off of the machine screws 25. This rear or cover member 21 has an extending hub 27 bored out to receive the anti-friction bushing 28, which bushing bears upon the pilot stud 3 formed on the forward end of the driven shaft 4. An anti-friction plate 29 lies between the rear end of the pinion 2 and the forward part of the cover plate 21 of cage 5 to reduce the friction between these parts for endwise thrust.

The hub 27 of the cover member 21 has a clutch ring 30 mounted and keyed thereupon as by the key 31. This ring 30 has a series of longitudinal splines thereupon, which splines preferably are cut in the shape of gear teeth to receive alternate friction plates or discs of the multiple disc clutch indicated at 32. These plates are kept from coming off of the splines by a suitable wire ring 33 laid in a groove in the splines, said groove extending circumferentially.

The opposite ends of the plates which are connected to the ring 30 are free and the plates between the aforesaid plates are notched to receive splines 34, which splines constitute merely extensions of the gear teeth formed in the internal gear ring 35, which gear ring surrounds and meshes with the pinions 16.

The gear ring 35 is clamped to a plate 36 by means of the cap screws 37, and this plate 36 has a hub member 38 splined onto the driven shaft 4. The splines on the driven shaft 4 extend from the reduced pilot portion 3 on back to the end of the shaft 4, and upon the rear end of this shaft there is mounted a companion flange 39 for connection to a driving coupling to the propeller shaft, or the like. The hub 40 of the companion flange 39 is splined to fit over the splined part of the shaft and to bear at its forward end against the inner bearing race of the radial anti-friction bearing 41. The shaft 4 has an integral collar 42 formed thereupon, and the inner race of the anti-friction bearing 41 is clamped between said collar 42 and the hub 40 by means of the nut 43 which is threaded upon the reduced end of the shaft 4.

The cheek of the plate 36 normally bears against the outer or rear friction plate of the multi disc clutch 32 and is pressed there against by means of a series of springs 44 which bear against a radial shoulder 45 in the rear half 8 of the gear cage 7, the forward ends of these springs 44 being received in sockets in a sheet metal thrust member 46. This member is apertured to extend over the hub 38 of the plate 36, and between the inner periphery of said thrust applying plate 46 and the plate 36 an axial thrust bearing 47 is interposed. This comprises, preferably, a ball bearing having its forward or rotating race mounted on the hub 38 at the junction of the hub with the plate 36. The stationary race is mounted in contact with the pressure applying plate 46 and it clears the hub 38.

The forward anti-friction bearing 6 supports both the radial load of the shaft 1 and connected parts, and also it receives the thrust due to the springs 44 in holding the clutch plate in engagement and it is adapted also to receive the thrust of the propeller shaft. The rear anti-friction bearing 41 is intended to take only the radial load, the outer ring of this bearing being free to slide in the bore of the hub 49 fromed on the rear of the housing section 8.

Provision for shifting the outer ring member 35 and plate 36 endwise is made as follows. A rock shaft 50, having suitable trunnions at its ends in the rear housing section 8, extends across the upper portion of said housing section. A shifter fork 51 has its hub 52 keyed to said rock shaft 50. At the ends of the arms of the shifter fork 51 a pin connection indicated in dotted lines at 52' is connected to a pressure plate 53 which bears against a flange 54, which flange is formed by threading a ring upon the rear end of the hub 38. A suitable anti-friction liner 55 lies between the plate 53 and the flange or ring 54.

Figure 3:
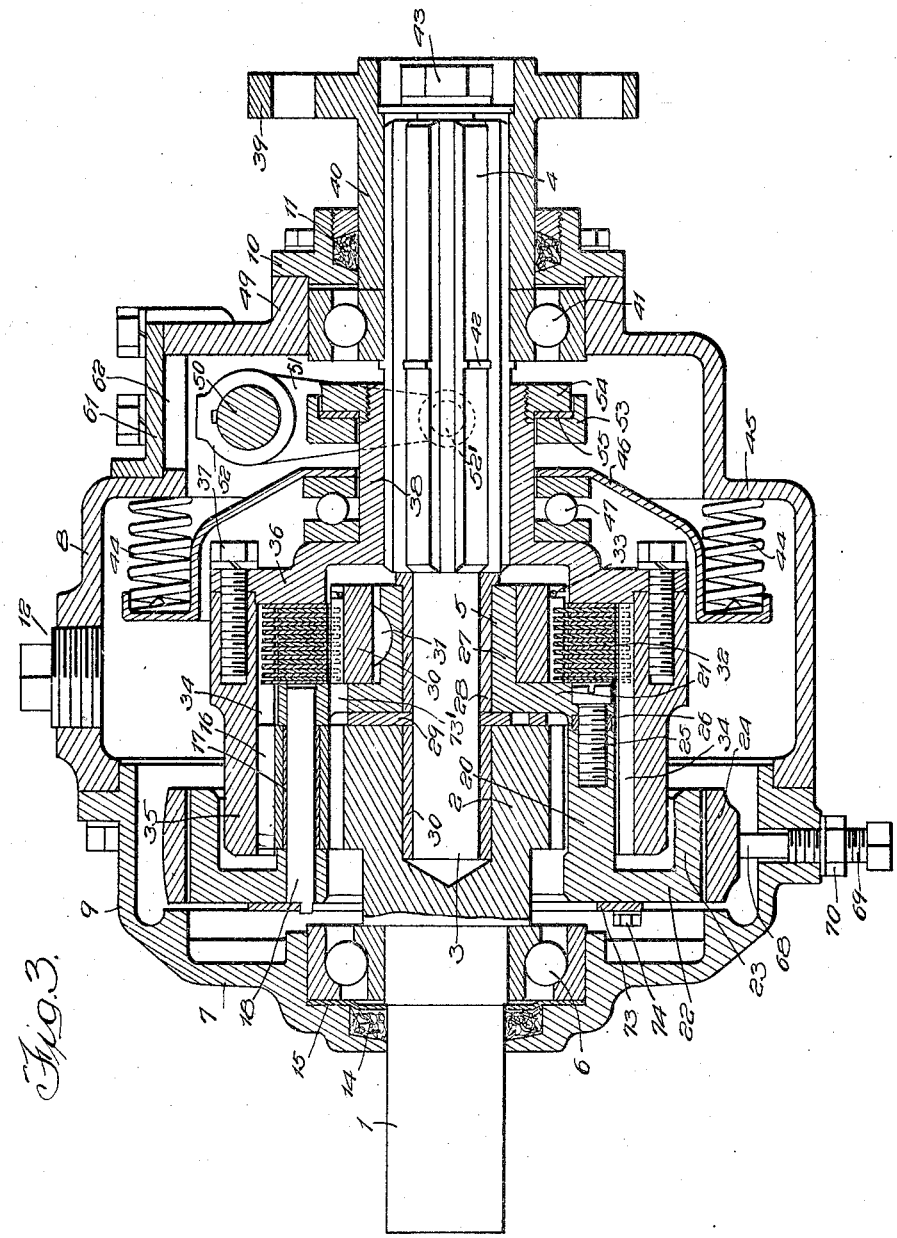
Fig. 3 is a vertical longitudinal section taken on the line 3—3 of Fig. 2.

Now it can be seen by rocking the shaft 50 in a counter clockwise direction, as viewed in Figure 3, the hub 38 and connected parts is pulled to the right as viewed in Figure 3 against the tension of the springs 44. This releases the pressure on the plate clutch 32 and shifts the internal gear ring 35 endwise on the pinions 16. Mesh between the pinions 16 and the ring gear 35 is not lost nor diminished since sufficient endwise length of these parts is provided to retain the desired bearing between them. It is necessary to shift the plate 36 only very slightly; in fact, it is necessary only to take the pressure off of the clutch plates to secure slippage of the parts.

The rock shaft 50 has an operating arm 56 (see Figure 1) clamped and keyed thereto, and the outer end of this operating arm 56 lies in the path of a cam member 57 connected to the hub 58 of an operating lever 59. As the arm 56 is keyed to the rock shaft 50 angular adjustment for wear, even though slight, cannot there be made and I provide, therefore, an adjustable contact member 60 in the form of an adjusting screw 60 in the free end of the lever 56.

A removable cover plate 61 is clamped over an opening 62 in the upper part of the housing section 8 to permit inspection of the rock shaft 50 and connected parts within the housing, and to permit proper assembly of the parts.

Figure 2:
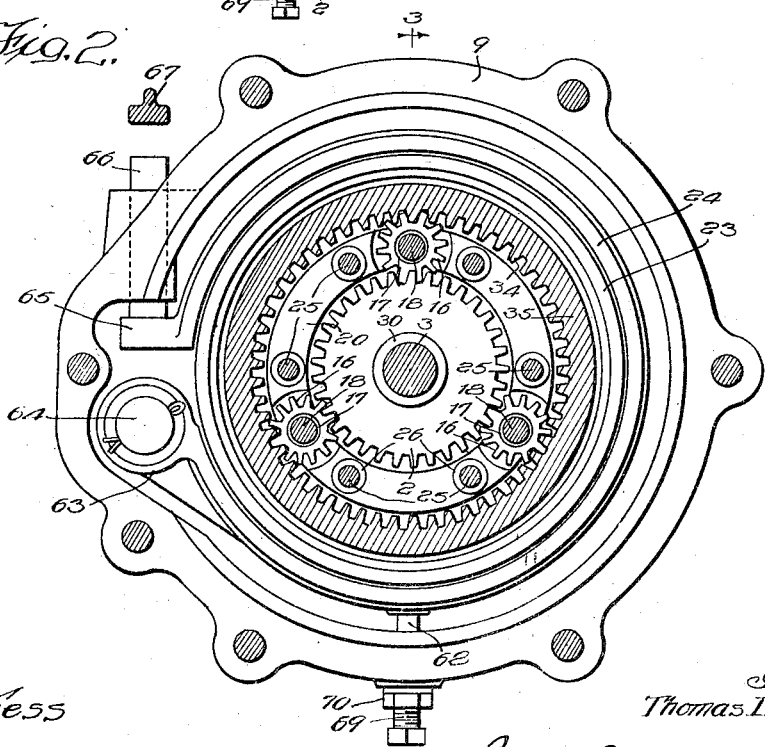
Fig. 2 is a section taken on the line 2—2 of Fig. 1, looking in the direction of the arrows.

The means for holding the cage 5 stationary for reverse drive comprises the friction band 24, shown in side elevation in Figure 2. This band is made preferably of a forging or casting with an integral anchor lug 63 at one end mounted on the stationary pin 64.

The anchor pin 64 for the brake band 24 is secured in the forward section 9 of the housing 7.

The opposite end of the band 24 has a lug 65 which lies in the path of a pressure pin 66 slidable in a bore formed in the part of the forward section 9 of the casing 7. This pin 66 is adapted at its upper end to project out of the cage and to be engaged by finger 67 borne on the hub 58 of the lever 59.

The finger 67 and the cam 57 are so interrelated that the pressure is first taken off of the multiple disc clutch 32 before the clutch band 24 is contracted onto the drum 23.

The clutch band 24 is machined to a diameter slightly larger than the drum 23 and is held in concentric position by a stop pin 68, which comprises a screw threaded shank 69 threaded through the bottom wall of the housing section 9 and held by a lock nut 70.

The operation of the device is as follows. Assuming that the driving shaft 1 is connected to the engine shaft of the vehicle, and the driven shaft 4 through the companion flange member 39 is connected to the propeller shaft of the vehicle, the normal drive is directly through the transmission since the shaft 4 is clutched to the shaft 1 through the multiple disc clutch 32, these plates which are anchored alternately to the internal gear ring 35 and to the ring 30 keyed to the cage 5 and held in frictional engagement by the springs 44. Since the internal gear and the cage are connected together and do not have relative motion, the pinions 16 are unable to turn and, as they have contact with the pinion 2 on at least three or four meshing teeth, a strong and highly satisfactory connection is provided between these parts.

If it is desired to interrupt the drive from the shaft 1 to the shaft 4, the lever 59 is swung in a counter clockwise direction, as viewed in Figure 1, whereupon the shifter fork 51 pulls the hub 38 backward against the tension of the springs 44, taking the pressure off of the multiple disc clutch plates 32. As a result these plates will slip past each other substantially without friction and the cage with its pinions 16 is rotated idly. This shifting of the fork 51 is secured by downward movement of the outer end of the arm 56 through engagement of the pin 60 with the cam 67. It will be noted that the cam has a relatively sharp rise and then a concentric dwell of considerable length. When the pin 60 rests on the concentric or circular dwell, the friction between the multiple disc plates 32 has been relieved. The relation of the parts is such that the pin 60 arrives on the circular dwell before the band 24 is sufficiently shrunk to contact with the friction drum 23. In fact, in the preferred embodiment of the invention, the multiple disc plates 32 are disengaged completely before the finger 67 engages with the thrust pin 66.

Thereafter, pressure applied to the pressure pin 66 is transmitted to the lug 65 to shrink the band 24 onto the drum and to hold the cage against rotation. By gradually applying this pressure the rate of reversal may be suitably controlled. Changing of the drive from forward to reverse, or vice versa, at full speed, is easily and readily accomplished without any clashing of gears or clutch dogs and under complete control of the operator. When the gear is in direct no frictional parts are rubbing and no idler gears are rotating with consequent noise and loss of power.

The transmission may be mounted on suitable lugs or brackets 72 formed integral with the housing section 8.

The bearing pins 18 upon which the pinions 16 are supported are prevented from endwise displacement in one direction, that is, the rear, by the friction plates 32, and at the front by engagement with a circular plate 73 suitably held to the flange 22 by cap screws and lock washers.

The construction above described is noteworthy from the standpoint of the bearings employed as it will be observed that there are three simple and relatively small diameter bearings which carry the entire load of the transmission. The front bearing serves the dual function of taking the propeller thrust and the thrust of the springs in maintaining pressure upon the multiple disc clutch. It also supports the radial load of the shaft 1. The rear bearing 41 carries the radial load of the shaft 4, and the shafts 1 and 4 being piloted together bear the load of the cage and the friction clutches. The rear bearing 41 carries the endwise pull on the propeller shaft and on driven shaft 4 in reverse direction, if any should be developed, between the shoulders 42 and the cover plate 10.

The convenience in manufacture and assembly is also noteworthy. The parts are all relatively small in diameter and easy and convenient to manufacture.

I provide an oil passageway 73' between the pinion 2 and the inner ends of the clutch plates 32, so that the oil driven out from between the teeth of the pinion 2 and the adjacent idler 16 is driven into contact, first with the anti-friction plate 29 and the pilot bearings 28 and 30, and also to the inner ends of said friction plates 32 to lubricate these parts thoroughly at all times.

I do not intend to be limited to the details shown and described.

I claim:

1. In combination, a driving and a driven shaft piloted in axial alignment, a driving pinion on the driving shaft, an internal gear splined for endwise motion on the driven shaft, a cage bearing a plurality of pinions meshing with the pinion and with the gear, said internal gear having a plurality of clutch plates splined upon the teeth thereof, said cage having a plurality of cooperating clutch plates splined thereupon, spring means for shifting the internal gear endwise to spring said plates into cooperating frictional engagement to connect the internal gear and the cage, and manual shift means for shifting said internal gear against the tension of said spring means.

2. In combination, a frame member, a driving shaft and a driven shaft having bearings in the frame member, said driving shaft having a pinion, said driven shaft having a reduced cylindrical portion and an enlarged splined portion, a plate having a hub provided with splines cooperating with the splined portion, an internal ring gear secured to said plate, said internal ring gear being longer axially than the pinion, a cage having a bearing on said cylindrical portion of the driven shaft, planet idlers meshing with the pinion and with the teeth of the internal ring gear supported in said cage, clutch plates keyed to the teeth of the internal ring gear, said cage having a hub, cooperating plates keyed to said hub, a spring pressure plate embracing the hub of the first named plate, coil springs lying between the frame and said plate, and an anti-friction bearing between said pressure plate and said first named plate.

3. In combination, a housing, a driving shaft having a pinion, a bearing at the front end of the housing, a driven shaft having a bearing at the rear end of the housing, said driven shaft having a cylindrical bearing portion and a splined portion back of said bearing portion, a cage mounted on the bearing portion of said driven shaft, idler pinions mounted in the cage and meshing with the drive pinion, an internal gear cylinder meshing with the idlers, said gear cylinder being longer than the pinion, a mounting plate for the gear cylinder splined on the splined portion of the driven shaft, clutch plates splined at their outer peripheries on the internal gear, cooperating clutch plates splined at their inner peripheries on the cage, a presser plate bearing against the mounting plate, spring means between the housing and the presser plate for causing the presser plate to clamp the clutch plates together, and means for clutching the cage to the frame.

4. In combination, a housing, a driving shaft, a pinion therefor, said driving shaft having a bearing at its forward end in the housing, a driven shaft having a bearing at the rear end of the housing, said driven shaft having a cylindrical bearing portion and having a splined portion back of the bearing portion, a cage journalled on the bearing portion of the driven shaft, idler pinions mounted in the cage and meshing with the driving pinion, an internal gear cylinder meshing with the idlers, a mounting plate for the gear cylinder splined on the splined portion of the driven shaft, clutch means lying between the mounting plate and the cage, a presser plate bearing against the mounting plate, spring means between the housing and the presser plate for holding said clutch in engagement, said forward bearing in the housing receiving the thrust of said springs and the thrust of the driven shaft, said bearing at the rear end of the housing receiving the pull on the driven shaft.

5. In combination, a driving shaft having a pinion and having a bearing at the forward end of the housing, a driven shaft having a bearing at the rear end of the housing, said driven shaft having a cylindrical bearing portion and a splined portion back of the bearing portion, a cage on the cylindrical bearing portion, idler pinions meshing with the driving pinion, an internal gear cylinder meshing with the idlers, a mounting plate for the gear cylinder splined on the splined portion, clutch means lying between the mounting plate and the cage for clutching said parts together, a cylindrical clutch drum mounted on the forward end of the cage, and a friction shoe secured to the housing and cooperating with the friction drum.

6. In combination, a housing, a driving shaft having a pinion, a bearing at the front end of the housing, a driven shaft having a bearing at the rear end of the housing, said shaft having a cylindrical bearing portion and a splined portion back of the bearing portion, a cage journalled on the cylindrical bearing portion, idler pinions in the cage meshing with the drive pinion, an internal gear cylinder meshing with the idlers, said internal gear cylinder being longer than the pinion and the idlers, a mounting plate for the internal gear cylinder splined on the splined portion of the driven shaft, clutch plates splined at their outer periphery on the teeth of the internal gear, cooperating clutch plates splined at their inner periphery to the cage, a presser plate bearing against the mounting plate, spring means between the housing and the presser plate for causing the presser plate to clamp the clutch plates together, said cage having a cylindrical friction drum of a greater diameter than the internal diameter of the gear cylinder, a rock shaft having a shifter fork for shifting said mounting plate to release the clutch plates, a resilient friction shoe to grip the brake cylinder, and a rocking lever for operating said fork and for applying said friction shoe to said drum alternately.

7. In combination, a gear, a cage surrounding the same, idlers in mesh with the gear carried by the cage, an internal gear embracing the idlers and in mesh with the same, a housing providing bearings for supporting the aforesaid parts, clutch means for clutching the gear cage and internal gear together for direct drive, spring means for applying said clutch means, clutch means for clutching the cage to the housing, a rock shaft having a fork for releasing said first clutch means, an arm bearing a cam follower, a manual control lever having cam means for engaging said cam follower, and means operated by said lever for actuating said second clutch means after said cam means has engaged the follower to release the first clutch means.

8. A reversing gear comprising a housing, a driving and a driven shaft, gear elements in the housing between said shafts including a clutch for clutching the shafts for direct drive and a clutch for stopping one of the gear elements for reverse drive, a lever pivoted to swing in the vertical plane having a pivot on the outside of said housing, a rock shaft extending into the housing for operating the first clutch means, a cam operated by the lever, and a cam follower secured to the rock shaft for engaging the cam to release the first clutch, a thrust pin for operating the second clutch, and means actuated by the lever for actuating said thrust pin after said cam and follower are in engagement.

In witness whereof, I hereunto subscribe my name this 1st day of February, 1927.

THOMAS L. FAWICK.